Aug. 21, 1945.　　L. G. MORTEN ET AL　　2,383,014
ELECTRICITY CONDUCTOR UNIT
Filed Sept. 13, 1940　　2 Sheets-Sheet 1
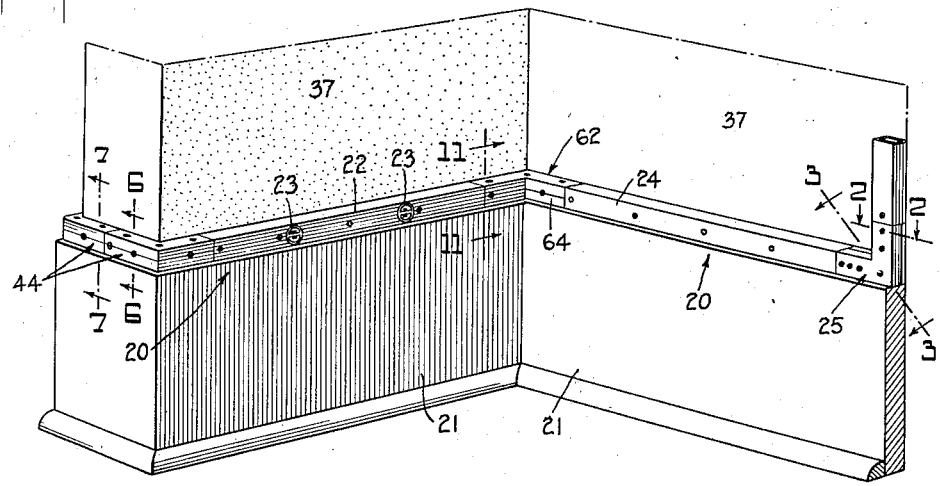
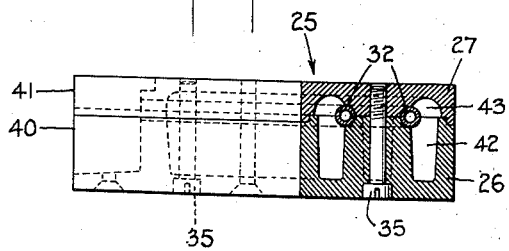
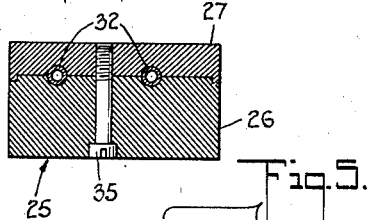
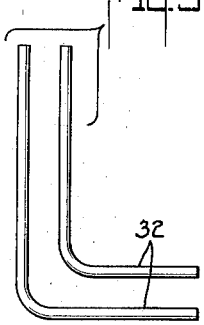
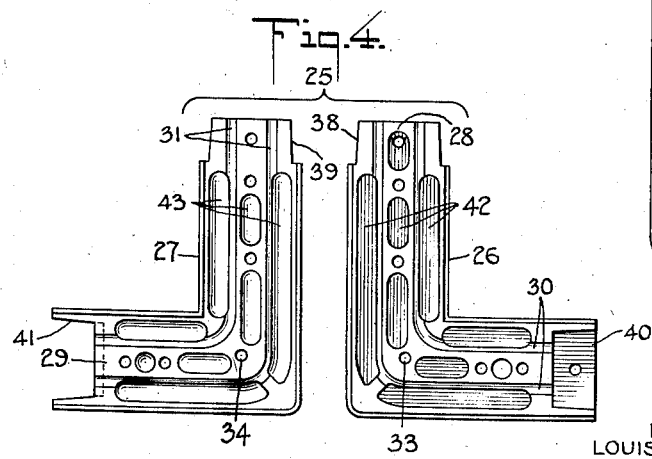
INVENTORS
LOUIS G. MORTEN AND
JOSEPH F. O'BRIEN
THEIR ATTORNEY

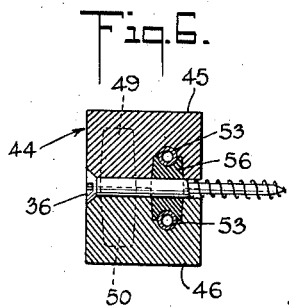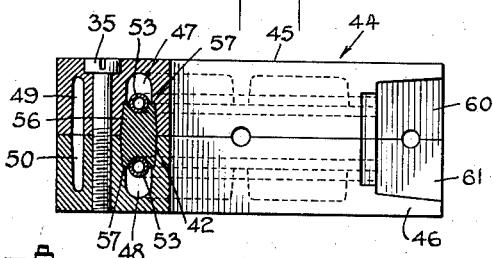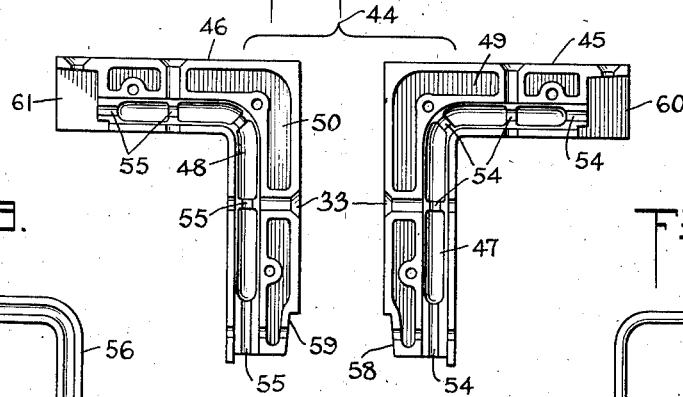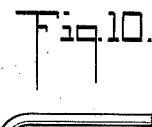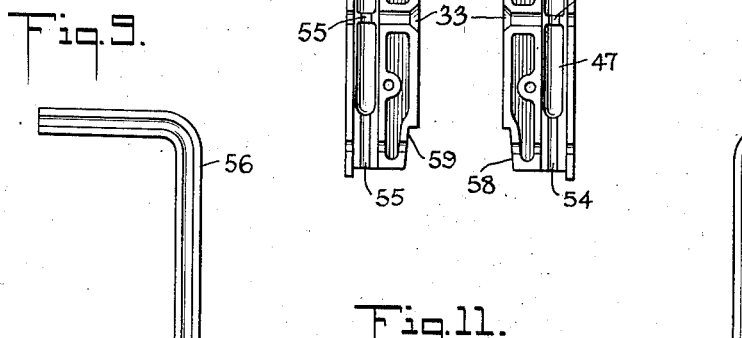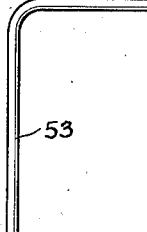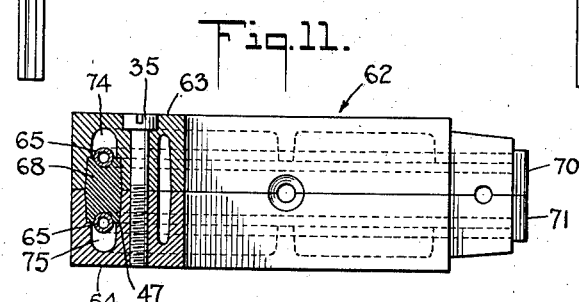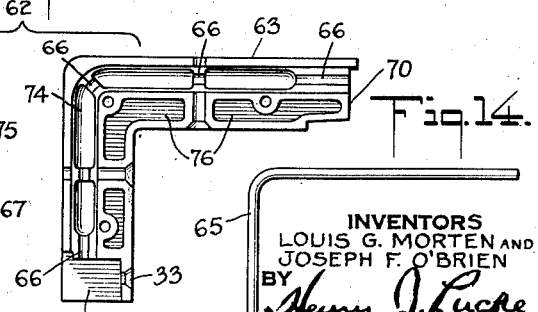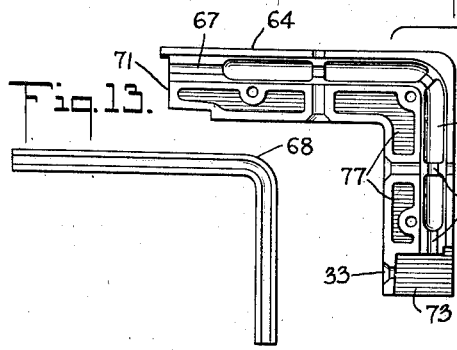

Patented Aug. 21, 1945

2,383,014

UNITED STATES PATENT OFFICE 2,383,014

ELECTRICITY CONDUCTOR UNIT

Louis G. Morten, Teaneck, and Joseph F. O'Brien, Jersey City, N. J., assignors to John B. Pierce Foundation, New York, N. Y., a corporation of New York Application September 13, 1940, Serial No. 356,604

6 Claims. (Cl. 173—334.1)

Our present invention relates to electrical wiring units.

In general, our invention relates to angular corner units serving to connect a system of longitudinal units in seriatim mechanically and electrically about the walls of a room, counter or other structure. Such longitudinal electrical wiring units may be, and preferably are, of the type set forth and claimed in our U. S. Patent No. 2,239,652, granted April 22, 1941, entitled Electrical unit.

The invention contemplates angular units of variant angular formations, generally described as convergent, divergent and vertical angular types. Such three angular types are readily adaptable for connecting a system of seriatim units in varied situations of angular contours encountered in practical installation.

By a vertical angular unit we mean an angular wired unit serving, say, to connect a horizontal unit with a vertical unit. By a divergent angular unit we mean a unit, usually positioned horizontally, the angular portions of which diverge from the observer as viewed from the front of the unit. By a convergent angular unit is meant a unit, usually positioned horizontally, the angular portions of which converge toward the observer.

Our present invention is particularly directed to any angular electrical unit the body of which is desirably formed of plastic material, preferably possessing electrical insulating qualities. Such body may be molded of two or more longitudinally extending sections which are suitably assembled to complete the unit. The outer face of the unit may be of any desired configuration, desirably simulating a molding or the like, and conforming with seriatim units with which it is connected.

The more preferred types of our invention comprise two sections having complementary interfitting parts provided with registering cavities for receiving and maintaining electrical conductors configurated generally to the configuration of the assembled unit.

Each unit may be provided with a male and a female end-formation respectively adapted to be mechanically connected with correspondingly opposite interfitting ends of contiguous units.

Preferred embodiments of our invention are provided with electrical conductors having tubular ends arranged and positioned to correspond to the tubular ends of electrical conductors of contiguous units, and thereby electrically and mechanically connected by interfitting, electrical conducting pins or equivalent.

Further features and objects of the present invention will be more fully understood from the following detail description and the accompanying drawings, in which Fig. 1 is a perspective view illustrating a typical application of our electrical wiring units such as an electrical extension, serving as a molding for the base board of a room; the illustration depicts several forms of angular contours corresponding to angular contours of meeting faces of inner walls of a building structure.

Fig. 2 is a detail horizontal transverse sectional view of a vertical angular unit taken on line 2—2 of Fig. 1, on an enlarged scale.

Fig. 3 is a detail transverse sectional view of the unit shown in Fig. 2 taken on the diagonal line 3—3 of Fig. 1.

Fig. 4 shows inner face views of two complementary interfitting, longitudinally extending sections, forming when superposed one upon the other a vertical angular unit such as that shown in Figs. 2 and 3.

Fig. 5 illustrates in elevation two electrical conductors applicable for use in a unit of the type shown in Fig. 4.

Fig. 6 is a detail vertical transverse sectional view of a divergent angular unit taken on line 6—6 of Fig. 1.

Fig. 7 is a detail vertical transverse sectional view of a divergent angular unit taken on line 7—7 of Fig. 1.

Fig. 8 shows inner face views of two complementary interfitting, longitudinally extending sections, forming whe superposed one upon the other a divergent angular unit such as is shown in Figs. 6 and 7.

Fig. 9 is a plan view of a grooved insulation strip applicable for use in a unit of the type shown in Fig. 8.

Fig. 10 is an elevation of an electrical conductor applicable for use in conjunction with a grooved insulation strip shown in Fig. 9, in a unit of the type shown in Fig. 8.

Fig. 11 is a vertical transverse sectional view of a convergent angular unit taken on line 11—11 of Fig. 1.

Fig. 12 shows inner face views of complementary sections of a convergent angular unit shown in Fig. 1, of the type shown in Fig. 11.

Fig. 13 is an elevational view of the grooved insulation strip applicable for use in a unit of the type shown in Fig. 12.

Fig. 14 is an elevation of an electrical conductor applicable for use in conjunction with the grooved insulation strip shown in Fig. 13, in a unit of the type shown in Fig. 12.

Referring to the drawings, Fig. 1 illustrates a typical system 20 of conductor carrying units, connected mechanically and electrically in seriatim, serving as an electrical extension and as molding, such as for a baseboard 21 and as a part of the structure of a room indicated in Fig. 1. Such system of units, as appears from Fig. 1, may comprise a unit 22 which is provided with outlets 23, 23, a unit 24 which is not constructed with any outlet means and corner units of variant angular configurations such as the vertical angular unit 25, the divergent angular units 44, 44 and the converging unit 62, etc.

It will be understood by those skilled in the art that in any electrical wiring units 22 having outlets 23, 23 the electrical conductors must be disposed sufficiently rearwardly of the front face of the unit to permit the prongs of an electrical plug of an electrical appliance such as a lamp, toaster, iron, etc., to be fully inserted within the outlets 23, 23 to insure a flush meeting of the contiguous faces of unit and plug.

To connect outlet-provided units, such as 22, in seriatim, angular corner units, pursuant to the instant invention, have their electrical conductors disposed relative to the front face of each unit so as to effect full support and proper alignment of the tubular termini of the conductors 32, 32 of like polarity of adjacent units to thereby afford proper electrical as well as mechanical connections of contiguous units, preferably with the use of conducting pins. Such electrical conductors 32, 32 are preferably tubular throughout.

Referring to Figs. 2 through 5, the vertical angular unit 25, see Fig. 4, comprises two complementary hollow shell bodies 26, 27, preferably molded of electrically insulating material such as plastic, rubber, or the like. Each hollow shell body includes shoulders 28, 29, disposed centrally of the body, each face of said shoulders being provided with grooves 30, 31, to receive and retain the conductors 32, 32 see Fig. 5, in mutually equidistant, predetermined relationship throughout the unit, from end to end.

The shoulders 28, 29, of the complementary sections 26 and 27 are provided with perforations 33, 34, adapted to receive screws 35, see Figs. 2 and 3, for retaining the sections 26 and 27 in mutually fixed relation, and also perforations through which pass screws 36 for securing the unit as an entirety to any suitable support 37, such as the indicated wall of a building structure.

The vertical angular unit 25 is shown provided at one end with complementary male end formations 38, 39 adapted to frictionally fit into corresponding complementary female end formations of contiguous units, and at its opposite end complementary female formations 40, 41 adapted to frictionally receive corresponding male end formations of adjacent units, see Fig. 1.

The complementary sections 26, 27 are formed with complementary recesses 42, 43, disposed interiorly of the unit and extending longitudinally of the unit and preferably for a greater portion of the length thereof. As appears in the embodiment shown in Figs. 2 and 4, certain portions of said recesses 42, 43, intersect said complementary grooves 30, 31, in which the electrical conductors 32, 32 are received, whereby the arc of each said grooves 30, 31 is less than 180 angular degrees. As appears in Fig. 2, the combination of such less-than-180 angular degree arcuate portions of the complementary grooves 30, 31, afford substantial exposure of the conductor surfaces whereby provision is afforded for ventilation and cooling of the electrical conductors, while supporting said electrical conductors throughout their lengths.

Referring now to Figs. 6, 7, 8, 9, and 10, the horizontal divergent angular unit 44, see Fig. 1, embodies complementary sections 45 and 46, see Fig. 8, having similar recesses 47, 48, 49, 50. The sections 45, 46, are formed with complementary male end formations 51, 52 adapted to frictionally interfit with the corresponding female end formations of continguous longitudinal seriatim units 22 and 24 or other corner units.

Divergent unit 44, adapted to connect with longitudinal units, differs structurally from the vertical angular unit 25 in that it is divided along a horizontal plane into sections 45, 46, see Fig. 1; the tubular conductors 53 of such unit are disposed rearwardly of the two sections 45, 46 for proper registry with the conductors of a unit 22 or 24. Conductors 53 are supported in accurately spaced alignment by a suitably grooved rubber insulation strip 56. It will be noted from Fig. 7 that the lateral edges of insulation strip 56 rest upon shoulders 57; the distance between a shoulder 57 of section 45 and the corresponding shoulder 57 of section 46 is such as to enforce a compression of strip 56 when the sections 45, 46 are made up, as by the screws 35. The upper portions of the conductors 53 engage with suitable transverse bridges 54, 55 respectively of the sections 45, 46. Such bridges support the conductors at suitable intervals along their length and at the ends of the units, and hold the conductors securely against the insulation strip 56. The end fittings, male 58, 59 and female 60, 61 respectively, of the diverging angular unit 44 are adapted to frictionally fit into the corresponding end-fittings of unit 22, see Fig. 1, and are retained by screws 36 or the like in fixed relation to a common support 37.

Referring to Figs. 11, 12, 13, and 14 the converging angular unit 62 embodies the third embodiment of our instant invention, see Fig. 12, and is, like the diverging angular unit 44, formed from complementary sections 63, 64. Tubular conductors 65 are secured by grooved bridge supports 66, 67 in vertically parallel relation, and are mounted within grooves of a resilient insulation strip 68, here shown as a molded rubber strip provided with grooves on its upper and lower face. When the respective sections 63, 64 are secured, as by screws 35 passing through suitable apertures formed in the sections, the resilient strip 68 is compressed into its polygonal formation hown in Fig. 11. Unit 62 is provided with male end-fittings 70, 71 and female end-fittings 72, 73 to frictionally fit corresponding end-fittings in contiguous faces of adjoining units. Units frictionally joined in such manner are maintained in fixed relation to a wall 37 or other common support by screws 36 or the like. Recesses 74, 75 provide air insulating chambers while recesses 76, 77 further eliminate surplus plastic material.

Whereas we have described our invention by reference to specific forms thereof, it will be understood that many changes and modifications may be made without departing from the spirit of the invention.

We claim:

1. A unit of an electrical wiring system comprising complementary sections forming a housing, the sections being provided interiorly with complementary members respectively extending lengthwise of the unit and having complementary arcuate portions, said members further having recesses extending longitudinally interiorly of the unit and intersecting said complementary arcuate portions, reducing the angular arc of each of such intersected arcuate portions to less than one hundred and eighty angular degrees, and electrical conductors respectively supported within said complementary arcuate members.

2. A unit of an electrical wiring system comprising complementary sections forming a housing, the sections being provided interiorly with complementary members respectvely extendng lengthwse of the unit and having complementary arcuate portions, said members further having recesses extending longitudinally interiorly of the unit for a greater portion of the length thereof and longitudinally intersecting said complementary arcuate portions, reducing the angular arc of each of such intersected arcuate portions to less than one hundred and eighty angular degrees, and electrical conductors respectively supported within said complementary arcuate members.

3. In a system of seriatim connected conductor-carrying units, a conductor unit comprising paired complementary sections of electrical insulation material, said sections being substantially hollow and providing a continuous internal aperture longitudinally of said unit, a resilient insulating strip adapted to be confined within said continuous internal aperture and placed under compression by said complementary sections when the latter are in assembled status, said resilient strip having grooves along opposite faces, electricity conductor means arranged within said grooves and presenting portions at the respective ends of the units, at which conductors of said seriatim may be electrically interconnected and transverse bridge means provided internally of each of said paired sections and having grooves adapted to receive a portion of said conductor means to urge the said conductor means into continuous engagement with said resilient insulating strip.

4. A unit of an electrical wiring system comprising complementary sections forming a housing, each of the sections being provided interiorly with complementary members respectively extending lengthwise of the unit, facial surfaces of said complementary members of the respective housing sections being in surface contact, and each of said complementary members being grooved to provide a longitudinally extending arc of substantially less than one hundred and eighty angular degrees; electricity conductors supported throughout their length within the channel afforded by the mating grooves of said complementary members; the said housing sections being provided with hollow portions extending respectively to said conductors to expose substantial areas of said conductors over the greater portion of their lengths.

5. A unit of an electrical wiring system comprising complementary sections forming a housing, each of the sections being provided with deep relatively wide recesses respectively mating when the complementary housing sections are assembled, to provide enlarged longitudinal passages within the housing of the unit, said recesses having grooved transverse bridges at intervals along their length, the bridges being of less height than the depth of the recesses, each said system of grooved transverse bridges receiving an electricity conductor extending longitudinally of the unit; and spacer means of insulation material positioned within the mating recesses, said spacer means being grooved on each of its opposite walls to receive said electricity conductors and support the same over the greater portion of the length of said conductors.

6. A unit according to claim 5, in which the spacer means is of resilient insulation material adapted to resiliently urge the conductors against the said transverse bridge means.

JOSEPH F. O'BRIEN.
LOUIS G. MORTEN.